United States Patent [19]

Lundberg et al.

[11] Patent Number: 4,480,063

[45] Date of Patent: Oct. 30, 1984

[54] POLYMER COMPOSITIONS BASED ON SULFONATED IONOMERS AND AMINE CONTAINING POLYMERS

[75] Inventors: Robert D. Lundberg, Bridgewater; Dennis G. Peiffer, East Brunswick; Robert R. Phillips, Spring Lk. Heights, all of N.J.

[73] Assignee: Exxon Research & Engineering Company, Florham Park, N.J.

[21] Appl. No.: 547,911

[22] Filed: Nov. 2, 1983

[51] Int. Cl.³ .......................... C08K 5/05; C08K 5/01; C08L 91/00

[52] U.S. Cl. ..................................... 524/399; 524/394; 524/425; 524/445; 524/451; 524/474; 524/516; 525/185; 525/186; 525/203

[58] Field of Search ........................ 525/203, 185, 186; 524/425, 516, 445, 451, 399, 474, 394; 260/DIG. 31

[56] References Cited

U.S. PATENT DOCUMENTS

| | | | |
|---|---|---|---|
| 3,454,676 | 7/1969 | Busse | 260/DIG. 31 |
| 3,639,528 | 2/1972 | Patton et al. | 523/203 |
| 4,127,546 | 11/1978 | Lundberg et al. | 260/DIG. 31 |
| 4,137,203 | 1/1979 | Makowski et al. | 260/DIG. 31 |
| 4,145,379 | 3/1979 | Lundberg et al. | 260/DIG. 31 |
| 4,147,677 | 4/1979 | Lundberg et al. | 260/DIG. 31 |
| 4,151,137 | 4/1979 | Duvdevani et al. | 260/DIG. 31 |
| 4,179,422 | 12/1979 | Makowski et al. | 524/291 |
| 4,187,206 | 2/1980 | Brenner | 524/426 |
| 4,308,365 | 12/1981 | Czerwinski | 525/377 |

OTHER PUBLICATIONS

Derwent Abst. 58110 C/33 (SU704964) 12-1979.

Primary Examiner—Herbert J. Lilling
Attorney, Agent, or Firm—Richard E. Nanfeldt

[57] ABSTRACT

This invention relates to thermoplastic and/or elastomer blend compositions having a viscosity at 200° C., at 0.73 sec$^{-1}$ of about 5000 to about $5 \times 10^6$ poises, wherein the compositions used for elastomeric articles which include a polymer complex of a neutralized sulfonated polymer and a polymer containing basic nitrogen atoms can also include about 25 to about 150 parts by weight of a nonpolar process oil per 100 parts of the polymer complex and about 50 to 300 parts by weight of a filler per 100 parts of the polymer complex. These blend compositions can be processed on conventional plastic fabrication equipment into polymeric articles having excellent physical properties.

26 Claims, No Drawings

POLYMER COMPOSITIONS BASED ON SULFONATED IONOMERS AND AMINE CONTAINING POLYMERS

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer.

The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VI-B, VII-B and VIII and mixtures thereof of the Periodic Table of Elements. Although these sulfonated elastomeric polymers prepared by the process of this patent are readily useable in a certain number of limited applications, they are deficient in properties compared to the improved compositions of the present invention.

U.S. Pat. No. 3,836,511, herein incorporated by reference, teaches an improved process for the sulfonation of the olefinic sites of the elastomeric polymer, wherein the improved sulfonating agent is selected from the group consisting of acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkylphthalate, a process oil or an organic acid ester. Additionally, a domain plasticizer can be incorporated into the composition, wherein the domain plasticizer can be incorporated into the composition, wherein the domain plasticizer reversibly disrupts the association of the sulfonated groups at a temperature of forming.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

Those references have taught that excellent elastomeric properties are attainable from Sulfo-EPDM, yet at the sulfonate levels desirable from a property viewpoint, the resulting materials are intractable in the absence of useful plasticizers.

A number of techniques have been considered as routes to overcome the lack of acceptable processability, including blending of sulfonated elastomers with crystalline polyolefins, polystyrenes and sulfonated polystyrenes. It was claimed that some improvements in flow behavior were observed in the presence of such polymers. Unfortunately polystyrene or sulfonated polystyrene are not compatible with Sulfo-EPDM or EPDM and, therefore, the resulting blends can exhibit poor and often irreproducible properties due to this incompatibility. There is a strong incentive to improve this compatibility for reasons that are described subsequently in this specification. The present invention describes an approach which optimizes the interactions between sulfonate-containing polymers and polymers which are normally incompatible such that the properties of these blends are improved markedly over those previously described in the prior art.

It is an object of this invention to provide a process for blending homogeneously, in a wide range of proportions, synthetic polymers which have hitherto been regarded as incompatible. Another object is to provide a process for blending synthetic rubbery copolymers and synthetic hard resinous polymers at an elevated temperature in a device such as a mill. A still further object is the provision of thermoplastic blended molding compositions which can be molded to form products which are strongly resistant to fracture on impact.

It is a further object of this invention to achieve free flowing powdered compositions based on different polymer backbones which can be blended in the powdered form to create uniform compositions capable of being injection molded or extruded.

U.S. Pat. No. 3,236,914 has taught that a blend of a polymer containing a minor amount of carboxylic acid and a second polymer containing basic nitrogen atoms can lead to homogeneous blends of synthetic polymers. It is important to note that the blends of that patent were based on the interaction of acid and base components. Similarly, Eisenberg et al (Polymer Eng. and Sci., 22 (17), 1117, 1982) have reported that the combination of a polymer such as polystyrene containing 5 mole percent sulfonic acid groups is combined with a second polymer such as ethyl acylate containing 5 mole percent vinyl pyridine, the resultant acid base reactions compatibilize the blend of these polymers.

While these aforementioned blends are based on acid-base interactions, the preferred compositions of the instant invention are based on the interaction of polymers containing *neutralized* sulfonate, carboxylate or phosphonate species and a second polymer containing basic nitrogen atoms. The problems of conversion arising from free acid species, the water sensitivity, the instability of those acid moieties are hereby circumvented in using neutralized components. In addition, the polymer complexes which are formed are different in the strength of the interaction from those systems derived from acid-base reactions.

The unique and novel improved compositions of the present invention overcome the deficiencies of the aforementioned U.S. patents and applications from both a rheological and physical properties aspect. The blend compositions of the present invention solve the problem of having a material which has both desirable rheological and physical properties for the manufacture of an elastomeric article such as a garden hose, wherein the extrudate of the resultant compositions do not exhibit melt fracture during extrusions processing as is the case in some of the aforementioned patents.

SUMMARY OF THE INVENTION

It has been surprisingly found that compositions formed from blends of a polymer complex of a neutralized sulfonated polymer and copolymers containing basic nitrogen atoms (such as styrene/vinyl pyridine copolymers), in particular a select class of neutralized sulfonated elastomeric polymers, and optionally, inorganic fillers, and a non-polar backbone oil, have suitable rheological and physical properties for the formation of an elastomeric article, namely a garden hose, by an extrusion process.

Accordingly, one of the objects of our present invention is to provide unique and novel compositions of matter for producing a high performance polymeric article by a variety of polymer processing operations.

A substantial segment of the plastics and rubber fabrication industry employs a fabrication technique known as extrusion to form articles which can be classified as sheet, profiles, tubing and film. The applications employing these fabrication techniques such as windshield wipers, weather stripping, refrigerator door seals, garden hoses, etc. require materials which are flexible and tough. Two broad classifications of materials which have been used are vulcanized elastomers and plasticized thermoplastics such as polyvinyl chloride (PVC). The fabrication of extrusion articles based on vulcanized elastomers is a major item of cost involving the vulcanization procedure. Not only is this step costly from an energy intensive viewpoint, but it is time consuming. The use of plasticating extrusion for thermoplastic materials is more economical and results in high extrusion rates for materials such as plasticized PVC. While these materials possess a degree of flexibility, they do not have a good rubbery feel or good low temperature flexibility. It is therefore desirable to have materials which can be processed on plastics-type extrusion equipment at conventional plastics rates and which possess the flexibility and subjective rubbery characteristics of vulcanized elastomers.

At the same time, it is desirable to alter the hardness and other physical properties of such articles by incorporation of various plastics, such as polystyrene. The incompatibility of such polymer blends results in a weak nonelastomeric product of little practical utility. The surprising findings of the present invention permit the preparation of such blends with unexpected good properties.

GENERAL DESCRIPTION

This present invention relates to unique and novel compositions of a polymer-complex of neutralized sulfonated polymer and polymers containing basic nitrogen atoms, wherein the resultant composition has a viscosity at 0.73 sec$^{-1}$ at 200° C. of about 5000 poise to about $5 \times 10^6$ poise.

The polymer complexes are formed by blending together the sulfonated polymers with the polymers containing basic nitrogen atoms. Obviously, these polymer blends are generally composed of at least two different copolymers in which the polymer backbone containing sulfonate groups (or carboxylate and phosphonate) is of a different chemical composition then that of the polymer chain containing basic nitrogen atoms. Specific examples of preferred polymers are described below.

The substantially linear nitrogen-containing synthetic polymers suitable for use in the process of this invention include both addition polymerisation polymers, e.g. vinyl chloride and acrylic copolymers, and polycondensation polymers such as polyamides, and obviously exclude naturally occuring nitrogen-containing materials such as proteins and the condensation products of formaldehyde with urea or melamine. When the nitrogen-containing polymers are addition polymerisation polymers, it is preferred that they be copolymers of a minor molar percent, i.e. not more than 50 molar percent, of monomers containing basic nitrogen atoms or amide nitrogen atoms. Examples of monomers containing basic nitrogen atoms are 2-vinylpyridine, 4-vinylpyridine and N:N-dimethylaminoethyl methacrylate.

In general, the sulfonated polymer will comprise from about 4 meq. up to 200 meq. of groups per 100 g. of polymer, more preferably from about 10 meq. to about 100 meq. per 100 g. polymer of pendant sulfonate groups. The sulfonated polymers utilized in the instant invention are neutralized with the basic materials selected from the group consisting of Groups IA, IIA, IB and IIB of the Periodic Table of Elements and lead, tin and antimony. Sulfonated polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated butyl-rubber, sulfonated ethylene-propylene terpolymers, sulfonated polyisoprene, and sulfonated elastomers and their copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1, to 15. The preparation of Butyl rubber is described in U.S. Pat. No. 2,356,128, which is incorporated herein by reference. For the purposes of this invention, the Butyl rubber may have incorporated therein from about 0.2 to 10% of combined multiolefin; preferably about 0.5 to about 6%; more preferably, about 1 to about 4%, e.g. 2%. Illustrative of such a Butyl rubber is Exxon Butyl 365 (Exxon Chemical Co.), having a mole percent unsaturation of about 2.0% and a Mooney viscosity (ML, 1+3, 212° F.) of about 40–50. Low molecular weight Butyl rubbers, i.e., Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt.% olefinic unsaturation, more preferably about 2 to about 8, most preferably about 3 to 7 defined according to the definition as found in ASTM-D-1418-64, and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a nonconjugated diene. Illustrative of these nonconjugated diene monomers which may be used in the terpolymer (EPDM) are 1,4-hexadiene, dicyclopentadiene, 5-ethylidene-2-norbornene, 5methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}_n$ of Vistalon 2504 is about 47,000, the $\overline{M}_v$ is about 145,000 and the $\overline{M}_w$ is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}_n$ of Vistalon 2504-20 is about 26,000, the $\overline{M}_v$ is about 90,000 and the $\overline{M}_w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}_n$) of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}_v$ of the EPDM terpolymer is preferably below about 350,000 and more preferably below about 300,000. The $\overline{M}_w$ of the EPDM terpolymer is preferably below about 500,000 and more preferably below about 350,000.

Suitable polystyrene polymers useful in forming the sulfonated polystyrene polymers have an $\overline{M}_n$ as measured by GPC of about 10,000 to about 500,000 more preferably about 20,000 to about 200,000 and most preferably about 50,000 to about 200,000.

In carrying out the process to prepare sulfonated polymers, the polymer is dissolved in a nonreactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and nonreactive solvent at a temperature of about −100° C. to about 100° C. for a period of time of about 1 to about 60 minutes, most preferably at room temperature for about 5 to about 45 minutes; and most preferably about 15 to about 30. Typical sulfonating agent are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethylphosphate. The most preferred sulfonation agent for this invention is an acyl sulfate selected from the group consisting of benzoyl, acetyl, propionyl and butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The acid form of the sulfonated elastomeric polymer has about 4 to about 200 meq. $SO_3H$ groups per 100 grams of sulfonated polymer, more preferably about 10 to about 100; and most preferably about 10 to about 50. The meq. of $SO_3H/100$ grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an Alizarin-Thymolphthalein endpoint.

The acid form of the sulfonated polymer is gel-free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighted sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated elastomeric polymer is done by the addition of a solution of a basic salt to the acid form of the sulfonated elastomeric polymer dissolved in the mixture of the aliphatic alcohol and nonreactive solvent. The basic salt is dissolved in a binary solvent system consisting of water and/or an aliphatic alcohol. The counterion of the basic salt is selected from antimony, iron, aluminum, lead, or Groups I-A, II-A, I-B or II-B of the Periodic Table of Elements and mixtures thereof. The anion of the basic salt is selected from a carboxylic acid having from about 1 to about 4 carbon atoms, a hydroxide, or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations. Other suitable counterions are titanium, vanadium, chromium and manganese.

A third species is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs). In the case of acid-base adducts, this invention covers specifically the acid form of sulfonated EPDM and the acid form of sulfonated butyl. These systems contain the low levels of acid groups coupled with the saturated polymer backbones which combine to make the acid-base adducts especially preferred.

A variety of polymer backbones will display the desirable properties discovered in this invention:

| Sulfonate-Containing Polymer | Amine Polymer |
|---|---|
| (A) Elastomers | |
| ○ Sulfonated EPDM | ○ Styrene/Vinyl Pyridine Copolymer |
| ○ Sulfonate Isoprene Copolymers | ○ Vinyl Pyridine/Styrene/Butadiene Terpolymers |
| ○ Sulfonate SBR Polymers | |
| ○ Sulfonated Butadiene Polymers | ○ Isoprene/Vinyl Pyridine Copolymer |
| ○ Sulfonated Butyl | |
| ○ Sulfonate-Containing Acrylate and Methacrylate Copolymers | ○ Ethylacrylate/Vinyl Pyridine Copolymer and Alkyl Acrylate Copolymers with Vinyl Pyridine, where the Alkyl group varies in carbon number from 1 to 18 |
| ○ Sulfonated Block Polymers | |
| (B) Plastics | |
| ○ Sulfonated Polystyrene | |
| ○ Sulfonated Poly t-butyl styrene | |
| ○ Sulfonate-Containing Polyethylene | ○ Methyl Methacrylate/Vinyl Pyridine Copolymer |
| ○ Sulfonate-Containing Copolymers of the above neutral monomers | and Alkyl Methacrylate copolymers with Vinyl Pyridine, wherein the number of carbon groups in the alkyl group varies from 1 to 18 carbon atoms. |
| | ○ Butadiene/Vinyl Pyridine Copolymer |
| | ○ Propylene/Vinyl Pyridine Block Copolymer |
| | ○ Ethylene/Vinyl Pyridine Block Copolymer |
| | ○ t-Butyl Styrene/vinyl Pyridine Copolymers |
| | ○ Vinyl Pyridine Copolymers with alpha-beta ethylenically unsaturated copolymers or terpolymers. |

Other sulfonate polymers that are useful in this invention include sulfonated polyisobutylene where these polymers have unsaturation at the ends of the polymer chains. The preparation of such polymers has been described by J. P. Kennedy et al, and the properties of the sulfonated adducts have been described by G. Wilks, V. P. Kennedy et al [Polymer Bulletin, 8, 821 (1982)]. These polymers also are incompassed within the scope of this invention.

The amount of vinyl pyridine in the amine-containing polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus, will generally exhibit itself at a given shear rate and temperature The shear rate for the onset of melt fracture indicates the upper shear rate for processing a given material. This is used as a characterization parameter for compounds employed in extrusion processing.

To the polymer complex can be added a preferential plasticizer selected from the group consisting of carboxylic acids having about 5 to about 30 carbon atoms, more preferably about 8 to about 22 carbon atoms, or basic salts of these carboxylic acids wherein the metal ion of the basic salt is selected from the group consisting essentially of aluminum, ammonium, lead, or Groups IA, IIA, IB or IIB of the Periodic Table of Elements and mixtures thereof. The carboxylic acids are selected from the group consisting essentially of lauric, myristic, palmitic or stearic acids and mixtures thereof; e.g., zinc stearate, magnesium stearate, or zinc laurate.

The preferential plasticizer is incorporated into the neutralized sulfonated elastomeric polymer at about 1 to about 30 parts by weight based on 100 parts of the sulfonated polymer complex, more preferably at about 5 to about 25, and most preferably at about 7 to about 20. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof.

The styrene-vinyl pyridine polymers of the polymer complex are formed by free radical copolymerization using techniques well-known in the polymer literature. Such polymers can be prepared by a variety of techniques with styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The polymer complex is formed by techniques well-known in the art. One approach is to simply blend the polymers dissolved in a suitable common solvent and recover the polymer complex by techniques well-known in the art. While this is a satisfactory process for preparing small amounts of complex, melt blending techniques are preferred. For example, the two polymers can be compounded on a two-roll mill to form the polymer complex. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch-type mixer, and the twin screw extruder is the preferred continuous mixer. The filler and nonpolar process oil can be compounded into the polymer complex by the aforementioned process subsequent to the formation of the polymer complex.

The resultant polymer complex has a viscosity at 200° C. and a shear rate of 0.73 sec$^{-1}$ of about 5,000 poise to about $5\times10^6$ poise, more preferably of about 20,000 poise to about $2\times10^6$ poise and most preferably of about 50,000 poise to about $2\times10^6$ poise. Both the neutralized sulfonated polymer and the basic nitrogen-containing polymer can be either an elastomeric or thermoplastic polymer and where either can be the major component of the polymer complex. Finally, a process known as dry blending can be employed wherein the components are employed as face flowing powders.

The fillers optionally employed in the present invention are selected from the group consisting of talcs, ground calcium carbonate, water precipitated calcium carbonate, or delaminated, calcined or hydrated clays and mixtures thereof. The fillers are incorporated into the blend composition at about 25 to about 350 parts by weight per 100 parts of the polymer complex, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption, as measured by grams of oil absorbed by 100 grams of filler, is about 10 to about 100, more preferably about 10 to about 85 and most preferably about 10 to about 75. Typical fillers employed in this invention are illustrated in Table I.

TABLE I

| Filler | Code # | Oil Absorption of oil/100 grams of filler | Specific gravity | Avg. Particle Size Micron | pH |
|---|---|---|---|---|---|
| calcium carbonate ground | Atomite | 15 | 2.71 | | 9.3 |
| calcium carbonate precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| talc magnesium silicate | Mistron Vapor | 60–70 | 2.75 | 2 | 9.0–7.5 |
| alumino silicate | | | | | |

The oils optionally employed in the present invention are nonpolar process oils having less than about 2 wt. % polar-type compounds as measured by molecular-type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to about 750. The preferred process oils are paraffinics. Table II illustrates typical oils encompassed by the scope of this invention.

The oils are incorporated into the blend composition at a concentration level of about 25 to about 200 parts by weight per 100 parts of the polymer complex; more preferably at about 25 to about 150, and most preferably at about 50 to about 150.

TABLE II

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

DETAILED DESCRIPTION

The advantages of both the rheological and physical properties of the compositions of the present invention can be more readily appreciated by reference to the following examples and tables. Unless otherwise specified, all measurements are in parts per hundred by weight.

EXAMPLE I

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfate, designated TP 398. The resulting polymer was available as a free-flowing crumb and employed in that form as a blending component in the following examples.

EXAMPLE 2

A copolymer of styrene and vinyl pyridine was prepared via a free radical emulsion copolymerization process. The preparation was conducted as follows:

In a suitable, stirred reaction vessel under a nitrogen blanket the following ingredients were charged:
120 ml. distilled water
50 g. styrene
3.2 g. sodium lauryl sulfate
0.1 g. dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finally disperse the coagulated polymer. The suspension was filtered and dryed in a vacuum oven at 60° C. for 24 hours.

The resulting product represented 80% conversion of the reactive monomers and contained 1.68% nitrogen corresponding to 12.5 mole % 4-vinyl pyridine incorporation.

EXAMPLE 3

Five grams of 20 meq. sulfonated EPDM, Zn salt of Example 1 when milled at 180° C., remains as a powder. With the addition of 0.25 g (5 phr) styrene-Co-4-vinyl pyridine of Example 2 and milling at 180° C., a rough spongy blend is obtained.

In a second blend, 0.5 g. (10 phr) styrene-Co-4-vinyl pyridine was milled with 5 g of the Sulfo-EPDM at the same temperature, obtaining a denser, less spongy blend.

A third blend was prepared under the same conditions with the level of styrene-Co-4-vinyl pyridine increased to 1 g (20 phr). A thicker, denser, tough blend was obtained.

Each blend, as well as the stock sulfonated EPDM which had been milled in a similar manner at 180° C., was compression molded into a pad (350° F., 20 tons). Stress-strain measurements obtained (Table III) show increasing tensile strength and modulus, as well as increased elongation with increased levels of styrene-Co-4-vinyl pyridine in the blend. Along with this enhancement in physical properties, an improvement in flow versus time is observed in melt index rheometry of the blends as compared to the control sample. Thermal mechanical analysis data show indications of softening at about 61° C. for the 20 phr styrene-Co-4-vinyl pyridine blend.

EXAMPLE 4

Blends of 20 meq. sulfonated EPDM, Zn salt of Example 1 were prepared with polystyrene (Dow Styron 666) by milling at 180° C. The first blend was prepared by adding 0.25 g. (5 phr) polystyrene to 5 g. of the sulfonated EPDM, obtaining a flabby, spongy powder.

In a second blend, 0.5 g (10 phr) polystyrene was milled with 5 g. of the sulfonated EPDM at 180° C., obtaining clumps of flat sponge.

A third blend was prepared under the same conditions with 1 g. (20 phr) polystyrene blended with 5 g. sulfonated EPDM. Here slabs of spongy product were obtained.

A fourth blend containing 2 g. (40 phr) polystyrene and 5 g. sulfonated EPDM produced a rough, stiff sheet.

Compression molded pads of each blend were prepared (350° F., 20 tons) and stress-strain measurements obtained (Table IV). The data show that with the addition of polystyrene, tensile strength is decreased. As a higher level of polystyrene is incorporated, elongation decreases.

These examples clearly show that blends of sulfonated EPDM and polystyrene, which do not contain the amine groups to interact with the metal sulfonated species do not possess the high strength and elongation of those systems described in Example 3. Instead they are stiff, weak, cheesy and exhibit incompatibility.

TABLE III

| Sample | Styrene-Co—4 Vinyl Pyridine, phr | Modulus 100% | Modulus 300% | Modulus 500% | Tensile, psi | Elongation % |
|---|---|---|---|---|---|---|
| III-1 | 0 | 180 | 400 | 1012 | 1205 | 550 |
| III-2 | 5 | 260 | 566 | 1297 | 1722 | 590 |
| III-3 | 10 | 313 | 663 | 1421 | 3014 | 660 |
| III-4 | 20 | 448 | 989 | 2146 | 3099 | 610 |

TABLE IV

| Sample | Polystyrene phr | Modulus 100% | Modulus 300% | Modulus 500% | Tensile, psi | Elongation % |
|---|---|---|---|---|---|---|
| IV-1 | 0 | 180 | 400 | 1012 | 1205 | 550 |
| IV-2 | 5 | 234 | — | — | 315 | 200 |
| IV-3 | 10 | — | — | — | 246 | 90 |
| IV-4 | 20 | — | — | — | 316 | 30 |
| IV-5 | 40 | — | — | — | 554 | 10 |

EXAMPLE 5

Mill blending sulfonated EPDM with poly-t-butyl styrene-4-vinyl pyridine and poly-t-butyl styrene In a similar manner and under similar conditions to Example 3, mill blends were prepared of sulfonated EPDM, Zn salt (Example 1) and poly-t-butyl styrene-4-vinyl pyridine at levels of 5, 10, 20 and 40 phr poly-t-butyl styrene-4-vinyl pyridine. A blend of sulfonated EPDM containing 40 phr of poly-t-butyl styrene (DP=600) were also prepared.

The poly-t-butyl styrene-Co-4-vinyl pyridine was prepared by polymerization of the following mixture:
40 g. t-butyl styrene
3 g. 4-vinyl pyridine
2.6 g. sodium lauryl suflate
0.16 g. potassium persulfate
100 ml. distilled water The product obtained contained 0.94% nitrogen corresponding to 10.36 mole % vinyl pyridine.

Compression molded pads (350° F., 20 tons) were prepared of each blend and stress-strain measurements obtained (Table V).

An improvement in flow versus time is observed in melt index rheometry of the poly-t-butyl styrene-4-vinyl pyridine blends, as compared to the sulfonated EPDM control sample.

These experiments can best be compared at 40 parts of poly-t-butyl styrene-vinyl pyridine copolymer with sulfonated EPDM versus 40 parts of poly-t-butyl styrene copolymer with sulfonated EPDM. In the former case, we achieve a modulus at 100% elongation of almost 1000 psi, while in the latter case, a value of about 280 psi is obtained. Clearly, the system involving amine-metal sulfonate interactions exhibits dramatically enhanced properties, while the control (with poly-t-butyl styrene) is much weaker.

TABLE V

| Sample | Blended With | PHR | Modulus 100% | Modulus 200% | Modulus 300% | Modulus 500% | Tensile psi | Elongation % |
|---|---|---|---|---|---|---|---|---|
| V-1 | — | — | 180 | — | 400 | 1012 | 1205 | 550 |
| V-2 | Poly-t-butyl styrene-4 vinyl pyridine | 5 | 295 | — | — | — | 368 | 170 |
| V-3 | Poly-t-butyl styrene-4 vinyl pyridine | 10 | 308 | — | — | — | 317 | 130 |
| V-4 | Poly-t-butyl styrene-4 vinyl pyridine | 20 | 712 | 902 | — | — | 931 | 210 |
| V-5 | Poly-t-butyl styrene-4 vinyl pyridine | 40 | 998 | — | — | — | 1009 | 110 |
| V-6 | Poly-t-butyl styrene | 40 | 141 | — | 279 | — | 296 | 330 |

EXAMPLE 6

Mill blending sulfonated EPDM, Zn salt (Example 1) with poly-styrene-4-vinyl pyridine (Example 2) in the presence of zinc stearate A zinc stearate (ZnSt$_2$) plasticized blend was prepared containing 10% zinc stearate by mill blending 25 g. sulfonated EPDM with 2.5 g. ZnST$_2$ at 135° C. The blend was a smooth, clear, rubbery sheet.

A mill blend of the ZnST$_2$ plasticized sulfonated EPDM was prepared at 135° C., incorporating 10 phr poly-styrene-4-vinyl pyridine copolymer. A hazy, rubbery pad was obtained.

A second mill blend was prepared at 135° C., incorporating 20 phr polystyrene-4-vinyl pyridine into the ZnST$_2$ plasticized sulfonated EPDM. A cloudy, rubbery pad was obtained.

Compression molded pads (350° F., 20 tons) were prepared via stress-strain measurements obtained (Table VI).

Incorporating poly-styrene-4-vinyl pyridine is seen to increase tensile strength and modulus without adversely effecting elongation. Most importantly it is seen that the combination of zinc stearate, zinc sulfonated EPDM, and styrene-vinyl pyridine copolymer provides a very stiff, high strength product with excellent elongation. The previous examples of this application have shown that the blends of the sulfonate and the amine-containing polymers give blends of enhanced properties. Often these blends can have enhanced melt viscosities as well, which can be disadvantageous for certain melt processing activities. The addition of zinc stearate or similar plasticizers improves the melt flow and the physical properties of these blends. While previous patents have shown zinc stearate can improve properties and flow of sulfonated EPDM, this finding is the first to out knowledge that polymer complexes can be improved.

TABLE VI

| Sample | ZnST$_2$, % | Styrene-Co-4-Vinyl Pyridine phr | Modulus, psi 100% | 300% | 500% | Tensile psi | Elongation % |
|---|---|---|---|---|---|---|---|
| VI-1 | — | — | 180 | 400 | 1012 | 1205 | 550 |
| VI-2 | 10 | 10 | 256 | 496 | 1434 | 5108 | 640 |
| VI-3 | 10 | 10 | 332 | 736 | 1701 | 5353 | 700 |
| VI-4 | 10 | 20 | 423 | 1175 | 2574 | 4885 | 630 |

It is evident from the examples above and from the discussion that there is a wide spectrum of blends which can be prepared from a given combination of two polymers, the sulfonate polymer and the polymer containing basic nitrogen groups. The stoichiometry of the resulting complex can be varied over very broad ranges depending on the specific properties desired. For the purposes of this invention, the ratio of sulfonate to basic nitrogen functions can range from about 0.03 to about 30, preferably from about 0.1 to 10. For many applications, a most preferred ratio is from about 0.2 to about 4.

Since many modifications and variations of this invention may be made without departing from the spirit or scope of the invention thereof, it is not intended to limit the spirit or scope thereof to the specific examples thereof.

What is claimed is:

1. A composition comprising having a viscosity at 0.73 sec$^{-1}$ at 200° C. of about 5000 poise to about $5 \times 10^6$ poise comprising interacting a blend of a neutralized sulfonated polymer containing from about 4 meq. of metal sulfonate per 100 g. of polymer up to 200 meq. per 100 g. of polymer, said sulfonate polymer being at least 95% neutralized, complexed with an amine-containing polymer, said polymer containing a minimum of three basic groups per polymer molecular, said basic nitrogen content of said amine containing polymer being from about 4 meq. up to 500 meq. per 100 g. of polymer, wherein the molar ratio of metal sulfonate groups to that of basic nitrogen atoms is from about 0.03 to about 30.

2. A composition according to claim 1 wherein the ratio of sulfonate to nitrogen atoms is about 0.1 to about 10.0.

3. A composition according to claim 1, wherein the polymeric backbone of said neutralized sulfonated copolymer is selected from the group consisting of Butyl, rubber, and EPDM terpolymer and said basic nitrogen atom containing polymer being a copolymer of styrene or a styrene derivative, and vinyl pyridine.

4. A composition according to claim 1 wherein said sulfonated groups are neutralized with a counterion being selected from the group consisting of the transition elements of the Periodic Table including scandium, titanium, vanadium, chromium, manganese, iron, cobalt, nickel, copper and zinc, as well as the subgroups typically associated with the aforementioned transition elements.

5. A composition according to claim 1 further including (a) about 25 to about 150 parts by weight of a nonpolar process oil per 100 parts of said polymer complex; and (b) about 50 to about 300 parts by weight of an inorganic filler per 100 parts by weight of said polymer complex.

6. A composition according to claim 1 or 3, wherein said sulfonated groups are neutralized with a counterion being selected from the group consisting of antimony, iron, aluminum, lead and Groups I-A, II-A, I-B and II-B of the Periodic Table of Elements and mixtures thereof.

7. A composition according to claim 3, wherein said filler has a particle size of about 0.03 to about 20 microns.

8. A composition according to claim 3 wherein the neutralized sulfonated polymer is said neutralized sulfonated EPDM terpolymer, the counterion is zinc, the sulfonate level ranges from 10 meq. up to 50 meq. per 100 g., the amine-containing polymer is based on a copolymer of styrene and vinyl pyridine, and the pyridine level ranges from about 5 meq. per 100 g. up to about 200 meq. per 100 g.

9. A composition according to claim 3, wherein said filler has an oil absorption of about 10 to about 100.

10. A composition according to claim 3, wherein said filler is selected from the group consisting of clay, talc, or calcium carbonate, and mixtures thereof.

11. A composition according to claim 3, wherein said nonpolar process oil is selected from the group consisting of paraffinic, naphthenic and aromatics and mixtures thereof.

12. A composition according to claim 1, further including about 1 to about 30 parts by weight of a preferential plasticizer per 100 grams of the complexed neutralized sulfonated polymer and basic nitrogen atom containing polymer, said preferential plasticizer being a metallic salt of a carboxylic acid having about 5 to about 30 carbon atoms.

13. A composition according to claim 12, wherein said preferential plasticizer is zinc stearate.

14. A composition according to claim 7, wherein said neutralized sulfonated polymer is a zinc sulfonated Butyl rubber.

15. A composition according to claim 7, wherein said neutralized sulfonated polymer is a zinc sulfonated polystyrene.

16. A composition according to claim 7, wherein said neutralized sulfonated polymer is a copolymer of isoprene and zinc sulfonated polystyrene.

17. A composition according to claim 7, wherein said neutralized sulfonated polymer is a copolymer of butadiene and zinc sulfonated styrene, a ratio of zinc sulfonated styrene to butadiene being about 0.1 to about 10.0

18. A composition according to claim 1, further including zinc stearate.

19. A composition according to claim 1, wherein said neutralized sulfonated polymer is thermoplastic and said amine-containing polymer is elastomeric.

20. A composition according to claim 18, wherein said neutralized sulfonated polymer is the major component.

21. A composition according to claim 18, wherein said neutralized sulfonated polymer is the minor component.

22. A composition according to claim 1, wherein said neutralized sulfonated polymer is elastomeric and said amine-containing polymer is thermoplastic.

23. A composition according to claim 21, wherein said neutralized sulfonated polymer is the major component.

24. A composition according to claim 21, wherein said amine-containing polymer is the major component.

25. A composition according to claim 1, wherein said neutralized sulfonated polymer and said amine-containing polymer are both elastomeric.

26. A composition according to claim 1, wherein said neutralized sulfonated polymer and said amine-containing polymer are both thermoplastics.

* * * * *